US006531675B2

(12) United States Patent
Faitel

(10) Patent No.: US 6,531,675 B2
(45) Date of Patent: Mar. 11, 2003

(54) LASER WELDING METHOD AND APPARATUS

(75) Inventor: William M. Faitel, New Baltimore, MI (US)

(73) Assignee: Unova IP Corp., Woodland Hills, CA (US)

(*) Notice: Subject to any disclaimer, the term of this patent is extended or adjusted under 35 U.S.C. 154(b) by 163 days.

(21) Appl. No.: 09/773,349

(22) Filed: Jan. 31, 2001

(65) Prior Publication Data

US 2002/0170889 A1 Nov. 21, 2002

(51) Int. Cl.[7] .............................................. B23K 26/04
(52) U.S. Cl. ..................................... 219/121.63; 219/55
(58) Field of Search ....................... 219/121.63, 121.64, 219/121.67, 121.68, 121.69, 121.65, 121.66, 121.7, 121.71, 121.72, 158, 159, 155

(56) References Cited

U.S. PATENT DOCUMENTS

| 4,674,670 | A |   | 6/1987  | Watanabe et al. |
| 5,064,991 | A |   | 11/1991 | Alborante |
| 5,115,115 | A |   | 5/1992  | Alborante |
| 5,142,118 | A | * | 8/1992  | Schlatter ................ 219/121.63 |
| 5,147,999 | A |   | 9/1992  | Dekumbis et al. |
| 5,229,571 | A | * | 7/1993  | Neiheisel ................ 219/121.63 |
| 5,500,507 | A |   | 3/1996  | Yoshiaki |
| 5,606,534 | A | * | 2/1997  | Stringer et al. .............. 367/128 |
| 5,798,627 | A |   | 8/1998  | Gilliland et al. |
| 5,814,787 | A | * | 9/1998  | Nishibayashi et al. . 219/121.64 |
| 5,841,098 | A |   | 11/1998 | Gedrat et al. |
| 5,961,861 | A |   | 10/1999 | McCay et al. |
| 6,018,136 | A |   | 1/2000  | Ohmi et al. |
| 6,064,629 | A | * | 5/2000  | Stringer et al. .............. 367/128 |
| 6,064,759 | A | * | 5/2000  | Buckley et al. .............. 382/154 |
| 6,072,149 | A |   | 6/2000  | Maruyama et al. |
| 6,373,025 | B1 | * | 4/2002 | Takeuchi et al. ........ 219/121.64 |

* cited by examiner

Primary Examiner—Tom Dunn
Assistant Examiner—Jonathan Johnson
(74) Attorney, Agent, or Firm—Reising, Ethington, Barnes, Kisselle, Learman & McCulloch, P.C.

(57) ABSTRACT

A laser welding method and apparatus includes a laser manipulator that directs a laser beam emitted from a laser generator at various predetermined angles toward predetermined positions within a laser work zone. A transport device passes workpieces through the laser work zone where the laser beam manipulator can direct a laser beam at desired interfacing portions of each workpiece to weld those interfacing portions together. The controller is programmed to cause the manipulator to weld the workpieces without halting their motion through the laser work zone.

24 Claims, 3 Drawing Sheets

LASER WELDING METHOD AND APPARATUS

TECHNICAL FIELD

This invention relates generally to a laser welding method and apparatus for welding workpieces supported on a pallet transported by a conveyor system.

BACKGROUND OF THE INVENTION

Laser welding systems that weld palletized assemblies transported by conveyor systems are known in the art. The conveyor systems index the palletized assemblies or workpieces into fixed positions to be welded.

A variety of approaches have been implemented for directing laser beams at various angles to the workpieces when they are presented in a position for welding. For example, U.S. Pat. Nos. 5,064,991 and 5,115,115 to Alborante; and U.S. Pat. No. 5,147,999 to Dekumbis et al.; disclose various methods for directing laser beams at workpieces. The Alborante '991 patent discloses a plurality of laser emitter sets used in a vehicle framing station in which each set of emitters is designed to be used for the particular vehicle body style. Alborante '115 patent discloses a laser torch on the end of a movable robot arm. Dekumbis et al. disclose a laser used for welding or coating a workpiece as well as means for manipulating a laser beam at various angles to the workpiece.

Existing laser welding systems also include a number of different approaches to controlling the movement of pallets and establishing the position of workpieces and pallets. For example, see U.S. Pat. No. 5,798,672 to Gilliland et al.; U.S. Pat. No. 6,018,136 to Ohmi et al.; U.S. Pat. No. 6,072,149 to Marmyama et al. Gilliland et al. disclose robot welding apparatus that includes a scanner that reads bar code labels and transmits positioning information to the robot or a welding apparatus controller. Ohmi et al. disclose a type of welding apparatus control system that includes a bar code scanner and reader for transmitting positioning information to a data processor that adjust the position of a welding torch. Maruyama et al disclose a laser welding apparatus for welding vehicle bodies. The apparatus includes a delivery system in which a beam path switching mirror can be moved in and out of the beam path to control the delivery of the beam to one or another scan head.

While they do not disclose laser welding per se, U.S. Pat. No. 6,072,419 to Maruyama et al. and U.S. Pat. No. 5,500,507 to Yoshiaki disclose manufacturing and machining systems respectively with systems for determining the positions of workpieces moving through an assembly line process. Watanabi U.S. Pat. No. 4,674,670 et al. disclose a manufacturing system for wire bonding lead frames in which the manufacturing process is automatically adjusted for the type of lead frame that is being bonded. The system includes TV cameras that view workpieces on a conveyor and provide positioning information, such as kind, shape and size of each workpiece to a central controller. The positioning information allows the controller to determine optimum wire bonding positions from each workpiece. Yoshiaki et al. disclose a laser beam machine system including a laser beam machine that can automatically machine a plurality of workpieces in sequence. A plurality of pallets, each supporting a workpiece, are stored in a pallet storing station or stoker, in a shelved manner. A transport device draws the pallet out from the pallet storing location and transports the pallet into the laser beam machine. After laser beam machining is completed, the pallet supporting the newly machined workpiece is stored in a predetermined location in the pallet storing station by the pallet transport device. The Yoshiaki et al. system also includes a memory medium disposed at a front surface of each pallet. Each memory medium stores information about the pallet that it is attached to. The information includes the type or configuration of workpiece supported on the pallet, the machining method to be used on the workpiece, and the storage position of the pallet within the stoker. A reader reads each memory medium and relays the information to a controller.

SUMMARY OF THE INVENTION

The invention is a laser welding apparatus for welding workpieces supported on a pallet transported by a conveyor system. The apparatus includes a laser generator and a laser manipulator configured and positioned to direct a laser beam emitted from the laser generator. The apparatus also includes a controller connected to the laser manipulator and configured to cause the laser manipulator to direct a laser beam from the laser generator at various predetermined angles toward predetermined positions within a laser work zone. A transport device is disposed adjacent the laser work zone and is configured to pass workpieces through the laser work zone where the laser beam manipulator can direct a laser beam onto desired interfacing portions of each workpiece to weld those interfacing portions together. The manipulator is additionally configured to weld the workpieces without halting workpiece motion through the laser work zone.

The invention also includes a method for welding work pieces supported on the pallet transported by a conveyor system. According to this method a laser manipulator is configured and positioned to receive a laser beam emitted from a laser generator. The laser manipulator is also configured and positioned to direct to that beam at various points within a laser work zone. A transport device is provided adjacent the laser work zone and is configured to pass work pieces through the laser work zone. A workpiece is then provided on a transport device and the transport device is caused to transport the workpiece through the laser work zone. Interfacing portions of the workpiece are then welded together by causing the laser beam manipulator to direct the laser beam at the interfacing portions as the workpiece is moving through the laser work zone.

According to another aspect of the invention, a pallet orientation sensor detects pallet orientation on the transport device and provides information to the controller that allows the controller to compensate for pallet orientation variations when commanding laser beam manipulator movement.

According to another aspect of the invention, the controller is programmed to direct the laser manipulator to weld pluralities of workpieces supported on single pallets disposed in a laser work zone. In a preferred embodiment, workpieces supported on a single pallet may be dissimilar from one another with the controller programmed to accomplish welds in selected interfacing regions of each dissimilar workpiece in the pallet in a single pass.

According to another aspect of the invention, the apparatus includes a two-way communication system. The communication system includes a pallet reader and a pallet programmer. The pallet reader is connected to the controller and sends signals to the controller corresponding to information read from passing pallets. The pallet programmer is also connected to the controller and uploads information to memory devices supported on the pallets. The pallet reader allows the controller to take into account information including pallet identification, the nature, quantity, orientation and position of workpieces supported on the pallet, processing history of workpieces on the pallet, the fixtures set-up holding the workpieces on the pallet, stage of assembly that the workpieces are in, and the destination in the origin of the pallet in the transport device. The pallet programmer allows information to be stored in individual pallets that can later be read by other pallet readers in the assembly line process. Information that the pallet programmer can upload to memory devices includes the type of process just completed on the workpiece supported on the pallet, the address of the station that the pallet should go to next for further processing, potential problems or flags detected by the controller such as workpieces out of position on the pallet, workpieces missing from the pallet, workpieces present on the pallet that the system does not recognize, and failure to complete a weld.

Objects, features and advantages of this invention include maximization of the use of laser welding machines by welding on the fly, the ability to weld parts almost continuously rather than waiting for parts to come to rest in a fixed position in a laser work zone, the ability to feed parts continuously into a welding apparatus while preceding parts are being welded, increasing the number workpiece surfaces that a laser can weld in a single pass because lines of sight between the manipulator and various workpieces are continuously changing as the workpieces pass through the laser work zone, and the ability to weld multiple workpieces supported on a single conveyor delivered pallet.

BRIEF DESCRIPTION OF THE DRAWINGS

These and other objects, features, and advantages of this invention will be apparent from the following detailed description of the preferred embodiment and best mode, appended claims, and accompanying drawings in which:

DETAILED DESCRIPTION

Figure 2:
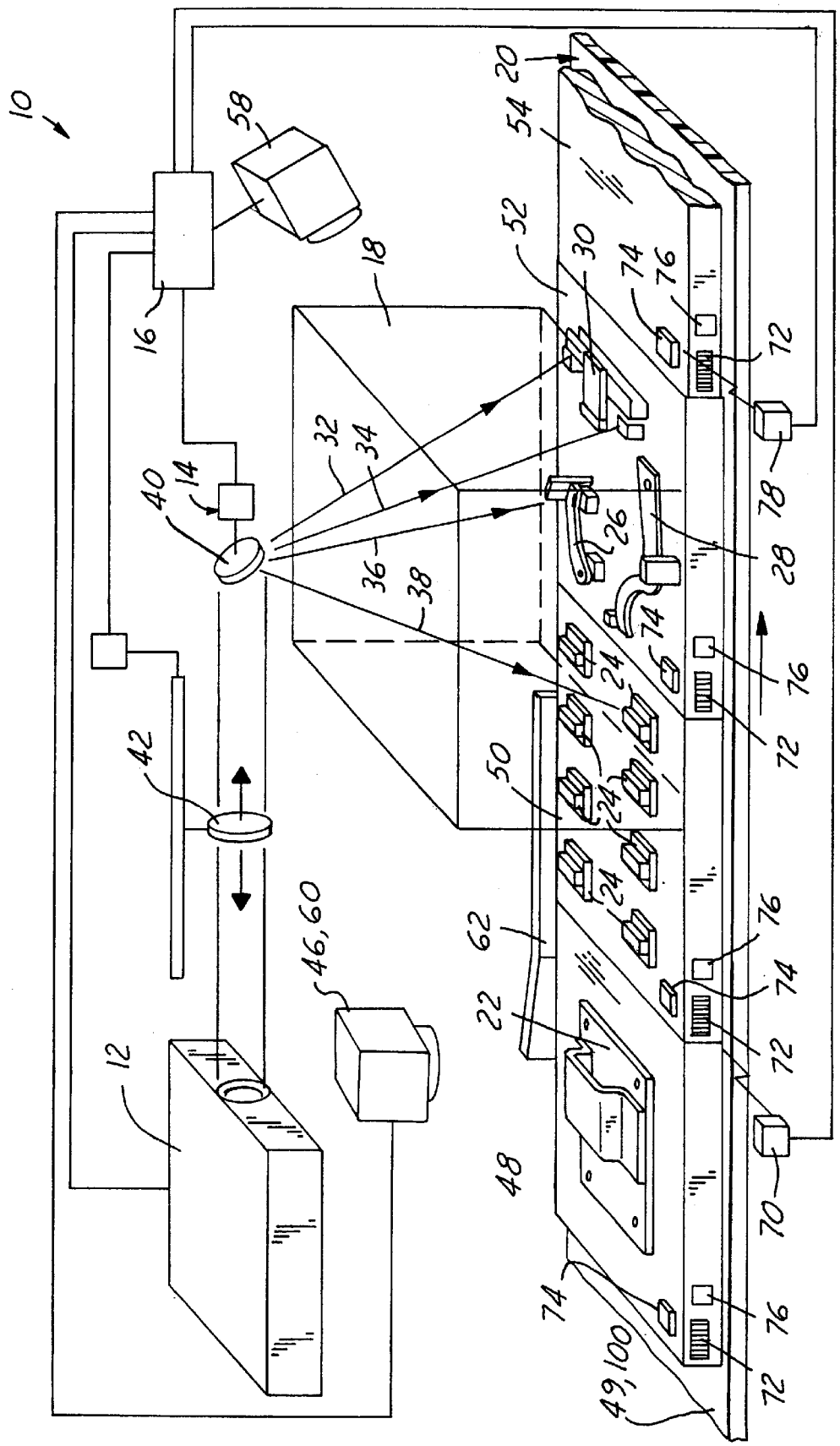
FIG. 2 is a diagrammatic perspective view of the laser welding apparatus of FIG. 1 showing pallets being presented to the laser welding apparatus, each pallet including a plurality of workpieces.

FIG. 2 illustrates a laser welding apparatus 10 for welding workpiece assemblies 22, 24, 26, 28, 30 supported on pallets 48, 50, 52 transported by a conveyor system 48. The apparatus 10 includes a laser generator 12, a laser manipulator 14 that directs laser beams emitted from the laser generator 12 and a controller 16 is connected to them. The controller 16 is programmed to energize and deenergize the laser generator 12 and to cause the laser manipulator 14 to direct the laser beam from the laser generator 12 at various predetermined angles toward predetermined positions within a laser work zone 18.

A transport device 20 is disposed adjacent the laser work zone 18 and passes workpiece assemblies 22, 24, 26, 28, 30 through the laser work zone 18 where the laser beam manipulator 14 can direct a laser beam at desired interfacing portions of each workpiece assembly 22, 24, 26, 28, 30 to weld those interfacing portions together. The controller 16 is further programmed to command the manipulator 14 to weld the workpiece assemblies 22, 24, 26, 28, 30 without stopping the transport device 20 and halting workpiece motion through the laser work zone 18. In other words, the apparatus 10 is constructed to accomplish laser welding on the fly. Welding on the fly maximizes use of the laser welding apparatus 10 because welding occurs while the workpiece assemblies 22, 24, 26, 28, 30 are moving. As a result, the laser is able to weld workpieces almost continuously rather then waiting for workpieces to come to rest in a fixed position in a laser work zone 18. The workpiece assemblies 22, 24, 26, 28, 30 may be fed continuously into the welding apparatus 10 while preceding assemblies are being welded. Welding on the fly also increases the number of workpiece surfaces that the laser can weld in a single pass. This is because lines of sight 32, 34, 36, 38 between the manipulator 14 and the various workpiece assemblies 22, 24, 26, 28, 30 are continuously changing as the workpiece assemblies 22, 24, 26, 28, 30 pass through the laser work zone The laser manipulator 14 is actually a laser beam manipulator 14 that directs a laser beam from the laser generator 12 to various target points without moving the laser generator 12. The beam manipulator 14 includes a movable laser beam steering optic in the form of a redirecting mirror 40 that redirects a laser beam from the laser generator 12 in desired directions in response to signals received from the controller 16. The laser beam manipulator 14 is therefore disposed remote from the laser generator 12 as shown in FIG. 2.

The laser beam manipulator 14 also includes a beam focusing optic 42 as shown in FIG. 2. The beam focusing optic 42 is movably disposed between the laser generator 12 and the mirror 40 in a position to adjust the focus a laser beam emitted from the generator 12 onto the mirror 40. The position of the focusing optic 42 is adjustable to maintain a consistent distance between the focusing optic 42 and a workpiece being lased as the workpiece being lased moves through the lasing zone 18.

Figure 3:
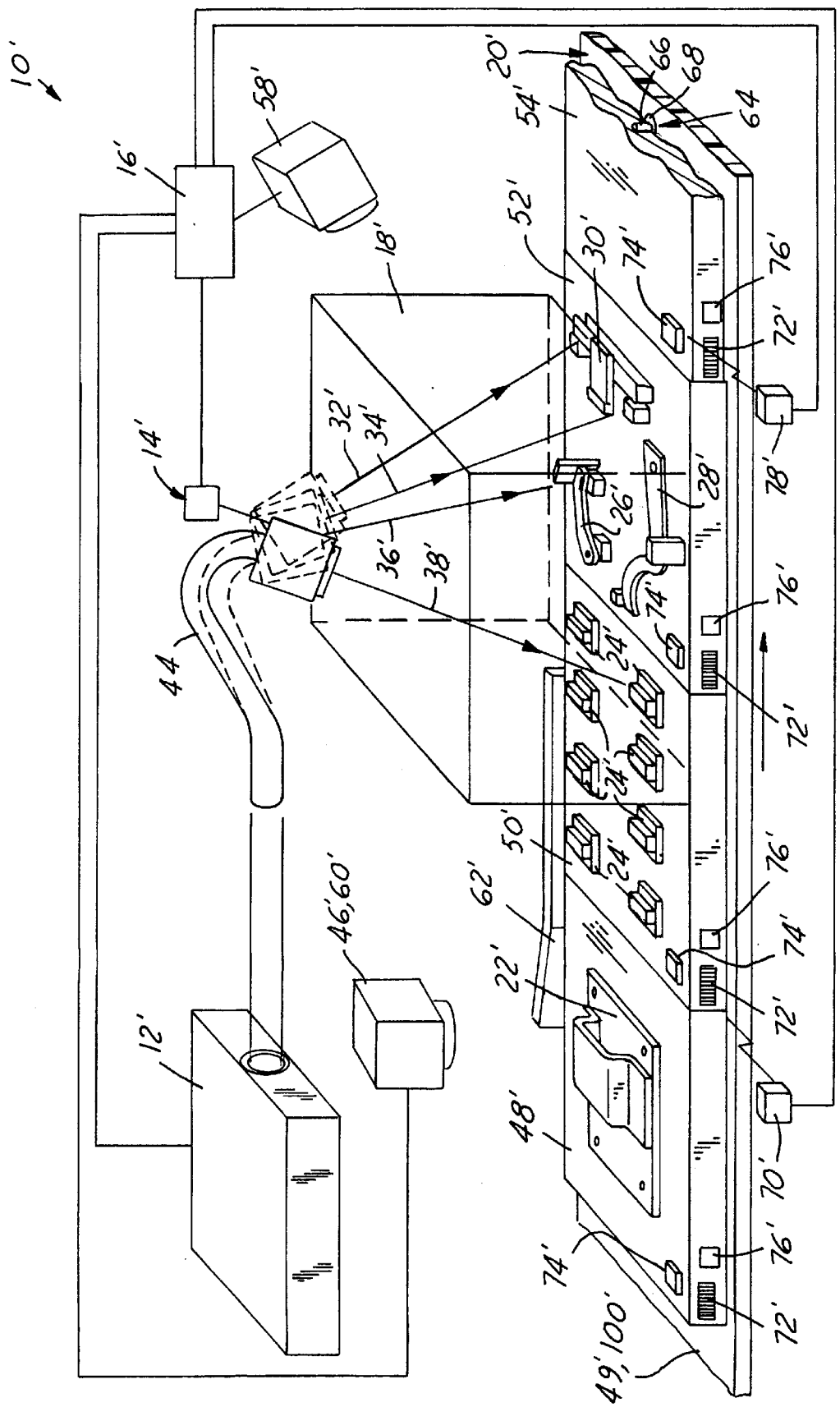
FIG. 3 is a diagrammatic perspective view of an alternative laser welding apparatus constructed according to the invention.

In an alternative embodiment shown in FIG. 3, the laser beam manipulator 14 includes a flexible fiber optic cable 44 and a movably supported cable lens assembly or focus module 45 in place of a beam redirector mirror 40. The focus module 45 aims a distal end of the flexible fiber optic cable 44 to direct the beam from a laser generator 12 at a desired target point. The focus module 45 is supported in such a way as to be able to both pivot the distal end of the cable 44 for aiming and to translate the end of the cable 44 for focusing. In addition, the focus module 45 collimates the beam as it exits the cable 44. A mechanical manipulator 14' pivots and translates the lens assembly 45. The mechanical manipulator 14' may be any one of a number of such devices known in the art to include a robot. The focus module and fiber optic cable also may be selected from any of a number of such devices known in the art. Reference numerals in FIG. 3 that are primed (') indicate structures common to the embodiment of FIG. 2.

The laser generator 12 is disposed in a position remote from the laser work zone 18 where the welding actually occurs. The laser work zone 18 is approximately one meter wide, one meter long and 0.75 meters high. The laser generator 12, the optics 42, the movable mirror 40 and the laser work zone 18 are all included within a laser welding cell or processing station shown at 44 in FIG. 1.

As shown in FIG. 2, the apparatus 10 includes an optical pallet orientation sensor 46 connected to the controller 16. The orientation sensor 46 detects the orientation of pallets 48, 50, 52, 54, 56 that support the workpiece assemblies on the transport device 20, as each pallet passes through the laser work zone 18 on a transport device 20. The controller 16 is programmed to compensate for pallet orientation variations when commanding laser beam manipulating movement in response to signals received from the pallet orientation sensor 46. Therefore, the pallet orientation sensor 46 allows pallets 48, 50, 52, 54, 56 to be transported by a simple conveyor 49 of the transport device 20 and allows pallets 48, 50, 52, 54, 56 to be placed on the conveyor 49 in a non-uniform manner.

A motion sensor 58 is connected to the controller 16 to sense workpiece speed through the laser work zone 18 and to send a signal to the controller 16 corresponding to that speed. The controller 16 is programmed to respond to such a signal by modifying commands to the laser beam manipulator 14 so that the movable mirror 40 redirects the laser beam in such a way as to compensate for workpiece speed while welding each workpiece assembly 22, 24, 26, 28, 30.

A position sensor 60 is also connected to the controller 16 to sense workpiece position as each workpiece assembly 22, 24, 26, 28, 30 moves through the laser work zone 18. The controller 16 is configured to track workpiece or pallet position in response to signals received from the position sensor 60. In the preferred embodiment shown in FIGS. 1 and 2, the optical pallet orientation sensor 46 also serves as the position sensor 60 by both determining pallet orientation on a conveyor 49 and monitoring pallet position as it passes through the laser work zone 18. In other embodiments, the position sensor 60 may include a laser range finder configured to detect the position of the workpiece assembly 22, 24, 26, 28, 30 and/or pallet 48, 50, 52, 54, 56 passing through the work zone 18.

In other embodiments, the optical pallet orientation sensor 46, the motion sensor 58 and the position sensor 60 may be combined into a single sensor unit that determines pallet orientation, work piece speed, and sense individual work piece positions.

To aid in positioning pallets 48, 50, 52, 54, 56, the apparatus 10 may also include a stationary rail 62 disposed adjacent and along one edge of the transport device 20 as shown in FIG. 2. The stationary rail 62 adjusts the position of a moving pallet 48, 50, 52, 54, 56 by directing the pallet 48, 50, 52, 54, 56 to a particular location on a surface of the conveyor 49 supporting the pallet 48, 50, 52, 54, 56. In other embodiments, and as shown in FIG. 3, the apparatus 10 may also include a locating device 64 including a pair of mating fasteners 66, 68 supported on the pallet 48, 50, 52, 54, 56 and on the conveyor 49 of the transport device 20, respectively. The mating fasteners 66, 68 would mechanically and positively locate each pallet 48, 50, 52, 54, 56 in a position on a conveyor belt, insuring that each workpiece assembly is in proper position for lasing.

The transport device conveyor 49 is a variable speed conveyor that changes speed in accordance with the number of workpiece assemblies 22, 24, 26, 28, 30 passing through the laser work zone 18 at a given time. The speed of the conveyor 49 is increased when a pallet 48, 50, 52, 54, 56 passing through the laser work zone 18 carries only one or a small number of workpiece assemblies 22, 24, 26, 28, 30 or when the configuration of the workpiece assemblies 22, 24, 26, 28, 30 on a given pallet 48, 50, 52, 54, 56 is of a relatively low complexity requiring less time for welding. The speed of the conveyor 49 is decreased when pallets, such as the pallets shown at 50 and 52 in FIG. 2, carry more than one workpiece assembly 24, 26, 28, 30. Conveyor speed is also decreased when a pallet, such as the pallet shown at 52 in FIG. 2, carries workpiece assemblies 26, 28, 30 of higher complexity that require more time to weld.

The laser welding apparatus controller 16 is programmed to command the laser beam manipulator 14 to compensate for variations in conveyor 49 speed as well as changes in complexity and placement and types of workpiece assemblies 22, 24, 26, 28, 30 on pallets 48, 50, 52, 54, 56 passing through the laser work zone 18. Therefore, the combination of the laser welding apparatus 10 and the variable speed conveyor 49 allows for greater through-put because, for each pallet and workpiece assembly configuration, the conveyor 49 can be run at an optimum speed corresponding to the ability of a laser welding apparatus 10 to successfully accomplish the welding operation.

The controller 16 is programmed to direct the laser manipulator 14 to weld pluralities of workpiece assemblies 24, 26, 28, 30 supported on single pallets 50, 52 moving through the laser work zone 18. The controller 16 is also programmed to direct the laser manipulator 14 to weld pluralities of different workpiece assemblies 26, 28, 30 supported on a single pallet, such as pallet 50, moving through the laser work zone 18. As shown in FIG. 2, a pallet reader 70 is connected to the controller 16 and transmits signals to the controller 16 that the controller 16 then uses to determine where the laser beam needs to be directed to accomplish desired welds in each case.

The reader 70 is programmed and positioned to send signals to the controller 16 corresponding to information read from passing pallets 48, 50, 52, 54, 56. This information includes pallet identification, the nature, quantity, orientation and position of the workpiece assemblies 22, 24, 26, 28, 30 supported on each pallet 48, 50, 52, 54, 56. The information also includes processing history of the workpiece assemblies 22, 24, 26, 28, 30 on each pallet 48, 50, 52, 54, 56, the fixture set up holding the workpiece assemblies 22, 24, 26, 28, 30 on each pallet 48, 50, 52, 54, 56, the stage of assembly that the workpiece assemblies 22, 24, 26, 28, 30 are in, and the destination and/or origin of each pallet 48, 50, 52, 54, 56 in the transport device conveyor system 48. The pallet reader 70 may either be an optical reader designed to read bar code tags 72 affixed to respective passing pallets 48, 50, 52, 54, 56 as shown in FIG. 2 or may be an electronic device that reads memory devices such as programmable chips 74 or RFID tags 76 affixed to respective passing pallets 48, 50, 52, 54, 56 as shown in FIG. 2.

As shown in FIG. 2, a pallet programmer 78 is connected to the controller 16 and is positioned to upload information to the memory devices 74, 76 supported on the pallets 48, 50, 52, 54, 56 as shown in FIG. 2. Information uploaded to the memory devices 74, 76 on the pallets 48, 50, 52, 54, 56 includes the type of process just completed on the workpiece assembly 22 or assemblies 24, 26, 28, 30 supported on each pallet 48, 50, 52, 54, 56, the address of the work station that each pallet 48, 50, 52, 54, 56 should go to next for further processing, and potential problems or flags detected by the controller 16. Problems that the controller 16 might detect include workpiece assemblies 22, 24, 26, 28, 30 being out of position on a pallet 48, 50, 52, 54, 56; workpiece assemblies 22, 24, 26, 28, 30 missing from a pallet 48, 50, 52, 54, 56; workpiece assemblies 22, 24, 26, 28, 30 present on a pallet 48, 50, 52, 54, 56 but that the system did not recognize; and/or failure to complete one or more welds of a workpiece on a pallet 48, 50, 52, 54, 56. Subsequent pallet readers 70 in the manufacturing process can use this information to determine where a pallet 48, 50, 52, 54, 56 should go next, whether a pallet 48, 50, 52, 54, 56 should be sidetracked to correct problems, or whether a pallet 48, 50, 52, 54, 56 should be returned to the laser welding cell for corrective action.

Figure 1:
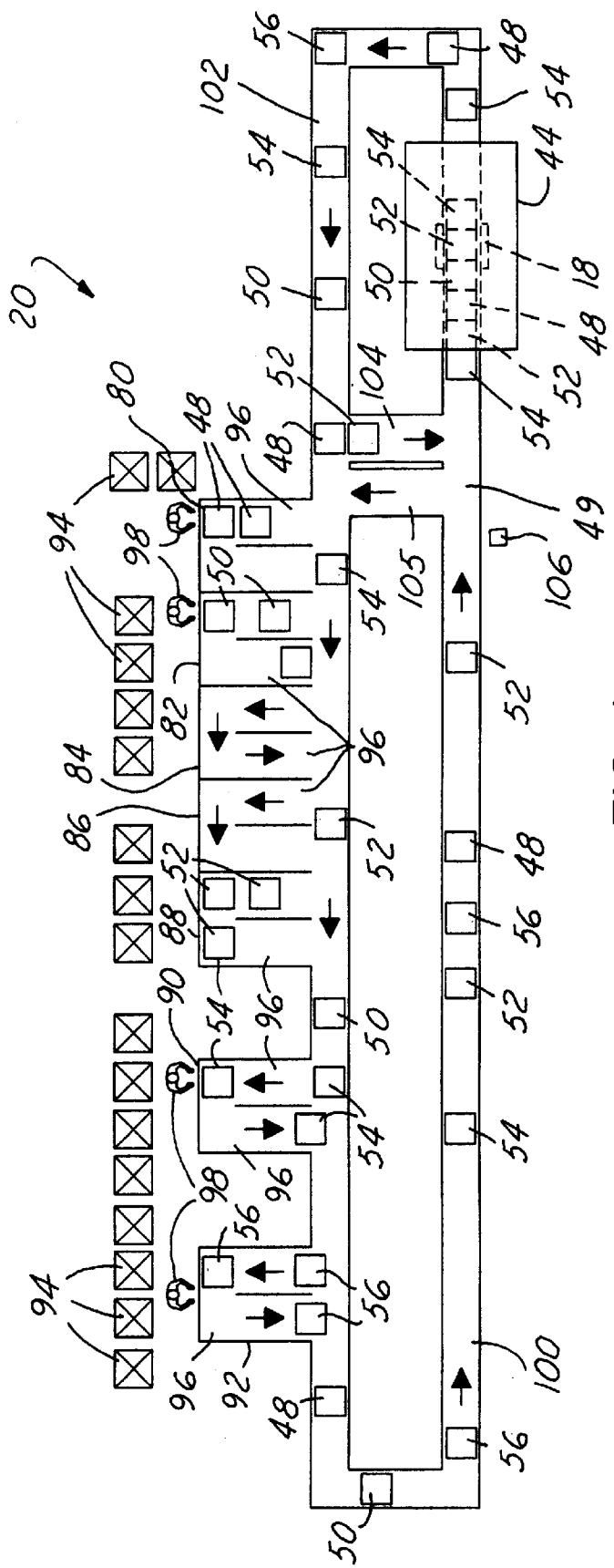
FIG. 1 is a diagrammatic plan view of a welding apparatus constructed according to the invention and disposed in the path of a flexible manufacturing conveyor system.

As best shown in FIG. 1, the transport device 20 includes a plurality of feeding stations 80, 82, 84, 86, 88, 90, 92. In FIG. 1 five feeding stations 80, 82, 88, 90 and 94 are active. At the active feeding stations 80, 82, 88, 90, 96, operators 98 load workpiece assemblies 22, 24, 26, 28, 30 from part bin 94 onto pallets 48, 50, 52, 54, 56 positioned on respective feeder conveyors 96. Once loaded, the feeder conveyors 96 are activated to transport the loaded pallets 48, 50, 52, 54, 56 from the respective feeding stations 80, 82, 88, 90, 92 to a main conveyor 100. The main conveyor 100 transports the pallets 48, 50, 52, 54, 56 to the laser welding cell 44. A return conveyor 102 transports the pallets 48, 50, 52, 54, 56 and workpiece assemblies 22, 24, 26, 28, 30 from the laser welding cell 44 back to the respective active feeding stations 80, 82, 88, 90, 96 where the operators 98 remove the welded workpiece assemblies 22, 24, 26, 28, 30 from their pallets 48, 50, 52, 54, 56 and load new workpiece assemblies 22, 24, 26, 28, 30 onto the pallets 48, 50, 52, 54, 56. A first recycle conveyor 104 is positioned to return pallets 48, 50, 52, 54, 56 carrying welded workpiece assemblies 22, 24, 26, 28, 30 or partially welded workpiece assemblies 22, 24, 26, 28, 30 back to the laser welding cell either to allow for a second welding pass for workpiece assemblies 22, 24, 26, 28, 30 that require a second pass, or to allow welding of certain regions of workpiece assemblies 22, 24, 26, 28, 30 not within a line of sight of the laser on the first pass. On a second pass, the first recycle conveyor 104 may be configured to re-orient pallets 48, 50, 52, 54, 56 in such a way as to place certain regions of the workpiece assemblies 22, 24, 26, 28, 30 within line of sight of the laser.

As is also shown in FIG. 1, a second recycle conveyor 105 is positioned to return to the loading stations 80, 82, 88, 90, 96 pallets 48, 50, 52, 54, 56 that are not ready to pass through the welding machine 44. A pallet configuration sensor 106 is disposed in a position upstream from the second recycle conveyor 105 along the main conveyor 100 to sense whether all intended workpiece assemblies 22, 24, 26, 28, 30 are present on each pallet. If, for example, an intended workpiece assembly is missing, the pallet configuration sensor 106 activates the second recycle conveyor 105 to return the incomplete pallet to a loading station where the missing workpiece assembly can be loaded.

In practice, once a pallet 48, 50, 52, 54, 56 loaded with workpiece assemblies 22, 24, 26, 28, 30 enters the laser work zone 18 the pallet reader 70 reads information from the passing pallet 48, 50, 52, 54, 56 and sends corresponding signals to the controller 16. As the pallet 48, 50, 52, 54, 56 continues through the laser work zone 18, the controller 16 commands the laser manipulator 14 to move the mirror 40 and focusing optic 42 in accordance with information received from the pallet reader 70 relating to the quantity and/or orientation and position of workpiece assemblies 22, 24, 26, 28, 30 supported on the pallet 48, 50, 52, 54, 56. The controller 16 also causes the laser generator 12 to energize at appropriate times to accomplish welds on the workpiece assemblies 22, 24, 26, 28, 30.

The laser beam manipulator 14 moves the mirror 40 to direct the laser toward interfacing portions of each workpiece assembly as the assemblies move together through the laser work zone 18. As successive pallets 48, 50, 52, 54, 56 move serially through the laser zone 18 the reader 70 transmits the information read from those pallets 48, 50, 52, 54, 56 to the controller 16 so that the controller 16 can adjust laser manipulator 14 movement to accommodate whatever type workpiece assemblies 22, 24, 26, 28, 30 are loaded on the pallet 48, 50, 52, 54, 56 and whatever fixturing is used on the pallet 48, 50, 52, 54, 56 to support the workpiece assemblies 22, 24, 26, 28, 30 in proper position for welding.

The controller 16 also uses information received from readers 70 to adjust the speed of the conveyor 49 to correspond to the amount of time that the laser beam manipulator 14 will need to accomplish the desired welding operations on each of the workpiece assemblies 22, 24, 26, 28, 30 on the pallet 48, 50, 52, 54, 56. As each pallet 48, 50, 52, 54, 56 leaves the laser welding cell 44 and passes the pallet programmer 78, the pallet programmer 78 uploads information from the controller 16 to whatever memory device 74, 76 is attached to the pallet 48, 50, 52, 54, 56. Subsequent pallet readers 70 along the conveyor system 20 read the information that the pallet programmer 78 has uploaded to the memory device 74, 76 and use that information to determine where to send the pallet 48, 50, 52, 54, 56 next and what operations should subsequently be performed on the pallet 48, 50, 52, 54, 56. As described above, this may include rerouting the pallet 48, 50, 52, 54, 56 back through the laser cell 44 to complete incomplete work or to pass the pallet 48, 50, 52, 54, 56 through the laser cell 44 in a different orientation to allow the laser manipulator 14 to reach portions of workpiece assemblies 22, 24, 26, 28, 30 not accessible with the pallet 48, 50, 52, 54, 56 orientated as it was on its initial pass through the laser work zone 18.

This description is intended to illustrate certain embodiments of the invention rather then to limit the invention. Therefore, it uses descriptive rather than limiting words. Obviously, it's possible to modify this invention from what the description teaches. Within the scope of the claims, one may practice the invention other then as described.

What is claimed is:

1. A laser welding apparatus for welding workpieces transported by a conveyor system, the apparatus comprising:
   a laser generator;
   a laser manipulator configured and positioned to direct a laser beam emitted from the laser generator;
   a controller connected to the laser manipulator and configured to cause the laser manipulator to direct a laser beam from the laser generator at various predetermined angles toward predetermined positions within a laser work zone;
   a transport device disposed adjacent the laser work zone and configured to pass workpieces through the laser work zone where the laser beam manipulator can direct a laser beam at desired interfacing portions of each workpiece to weld those interfacing portions together; and
   the manipulator being configured to weld the workpieces without halting workpiece motion through the laser work zone.

2. A laser welding apparatus as defined in claim 1 in which the controller is configured to cause the laser manipulator to maintain a fixed focus length from a workpiece as the workpiece moves through the laser work zone.

3. A laser welding apparatus as defined in claim 1 in which the laser manipulator is a laser beam manipulator configured to direct a laser beam from the laser generator without moving the laser generator.

4. A laser welding apparatus as defined in claim 3 in which the laser beam manipulator includes a movable laser beam directing mirror configured to direct a laser beam from the laser generator in desired directions in response to signals received from the controller.

5. A laser welding apparatus as defined in claim 3 in which the laser beam manipulator includes a flexible fiber optic cable that directs the beam in whatever direction a distal end of the cable is aimed.

6. A laser welding apparatus as defined in claim 4 in which the laser beam manipulator includes beam-focusing optics disposed between the laser generator and the mirror and configured and positioned to focus a laser beam from the generator onto the mirror.

7. A laser welding apparatus as defined in claim 3 in which the laser generator is disposed remote from the laser work zone.

8. A laser welding apparatus as defined in claim 1 in which:
   the apparatus includes a pallet orientation sensor connected to the controller and configured to detect pallet orientation on the transport device; and
   the controller is configured to compensate for pallet orientation variations when commanding laser beam manipulator movement.

9. A laser welding apparatus as defined in claim 1 in which:
   the apparatus includes a motion sensor connected to the controller and configured to sense workpiece speed through the laser work zone and to send a signal to the controller corresponding to that speed, and
   the controller is configured to respond to such a signal by modifying commands to the laser beam manipulator so that the laser beam manipulator continuously re-directs and focuses the laser beam in such a way as to compensate for workpiece speed while welding each workpiece.

10. A laser welding apparatus as defined in claim 1 in which:
    the apparatus includes a position sensor connected to the controller and configured to sense workpiece position as each workpiece moves through the laser work zone; and
    the controller is configured to track workpiece position in response to signals received from the position sensor.

11. A laser welding apparatus as defined in claim 10 in which the position sensor includes an optical sensor configured to optically determine the position of a workpiece passing through the laser work zone.

12. A laser welding apparatus as defined in claim 10 in which the position sensor includes a laser range finder configured to detect the position of a workpiece passing through the laser work zone.

13. A laser welding apparatus as defined in claim 1 in which the transport device includes a variable-speed conveyor configured to change speed in accordance with the number of workpieces passing through the laser work zone at a given time.

14. A laser welding apparatus as defined in claim 13 in which the variable-speed conveyor is configured to change speed in accordance with the amount of welding required by a workpiece passing through the laser work zone.

15. A laser welding apparatus as defined in claim 1 in which the controller is configured to direct the laser manipulator to weld pluralities of workpieces supported on single pallets moving through the laser work zone.

16. A laser welding apparatus for welding workpieces supported on a pallet transported by a conveyor system, the apparatus comprising:
    a laser generator;
    a laser manipulator configured and positioned to direct a laser beam emitted from the laser generator;
    a controller connected to the laser manipulator and configured to cause the laser manipulator to direct a laser beam from the laser generator at various predetermined angles toward predetermined positions within a laser work zone;
    a transport device disposed adjacent the laser work zone and configured to pass workpieces supported on pallets through the laser work zone where the laser beam manipulator can direct a laser beam at desired interfacing portions of each workpiece to weld those interfacing portions together;
    a pallet orientation sensor connected to the controller and configured to detect pallet orientation on the transport device; and
    the controller is configured to compensate for pallet orientation variations when commanding laser beam manipulator movement.

17. A laser welding apparatus for welding workpieces supported on a pallet transported by a conveyor system, the apparatus comprising:
    a laser generator;
    a laser manipulator configured and positioned to direct a laser beam emitted from the laser generator;
    a controller connected to the laser manipulator and configured to cause the laser manipulator to direct a laser beam from the laser generator at various predetermined angles toward predetermined positions within a laser work zone;
    a transport device disposed adjacent the laser work zone and configured to pass workpieces through the laser work zone where the laser beam manipulator can direct a laser beam at desired interfacing portions of each workpiece to weld those interfacing portions together; and
    the controller is configured to direct the laser manipulator to weld pluralities of workpieces supported on single pallets disposed in the laser work zone.

18. A laser welding apparatus as defined in claim 17 in which the controller is configured to direct the laser manipulator to weld pluralities of different workpieces supported on single pallets in the laser work zone.

19. A laser welding apparatus as defined in claim 17 in which the apparatus includes a pallet reader connected to the controller and configured and Positioned to send signals to the controller corresponding to information read from passing pallets.

20. A laser welding apparatus as defined in claim 19 in which the pallet reader is configured to optically read information affixed in a visual format to respective passing pallets.

21. A laser welding apparatus as defined in claim 19 in which the pallet reader is configured to electronically read memory devices affixed to respective passing pallets.

22. A laser welding apparatus as defined in claim 17 in which the apparatus includes a pallet programmer connected to the controller and configured and positioned to upload information to memory devices supported on the pallets.

23. A laser welding apparatus as defined in claim 17 in which the transport device includes:
    a main conveyor configured to transport pallets to the laser welding cell;
    a return conveyor configured to transport pallets of welded workpieces to the respective loading stations; and
    a recycle conveyor positioned to return pallets carrying welded workpieces back to the laser welding cell.

24. A laser welding apparatus as defined in claim 17 further including:
    a pallet reader connected to the controller and configured and positioned to send signals to the controller corresponding to information read from passing pallets; and
    a pallet programmer connected to the controller and configured and positioned to upload information to memory devices supported on the pallets.

* * * * *